(12) United States Patent
Sanders et al.

(10) Patent No.: US 10,598,492 B2
(45) Date of Patent: Mar. 24, 2020

(54) RESONANT FIBER OPTIC GYROSCOPE WITH HOLLOW CORE FIBER

(71) Applicant: Honeywell International Inc., Morris Plains, NJ (US)

(72) Inventors: Glen A. Sanders, Scottsdale, AZ (US); Lee K. Strandjord, Tonka Bay, MN (US)

(73) Assignee: Honeywell International Inc., Morris Plains, MD (US)

( * ) Notice: Subject to any disclaimer, the term of this patent is extended or adjusted under 35 U.S.C. 154(b) by 105 days.

(21) Appl. No.: 15/635,506

(22) Filed: Jun. 28, 2017

(65) Prior Publication Data

US 2019/0003834 A1    Jan. 3, 2019

(51) Int. Cl.
*G01C 19/72* (2006.01)
*G02B 6/02* (2006.01)

(52) U.S. Cl.
CPC ......... *G01C 19/722* (2013.01); *G01C 19/727* (2013.01); *G02B 6/02328* (2013.01)

(58) Field of Classification Search
CPC . G01C 19/722; G01C 19/727; G02B 6/02328
See application file for complete search history.

(56) References Cited

U.S. PATENT DOCUMENTS

| 7,327,460 B2 | 2/2008 | Sanders et al. |
| 7,463,360 B2 | 12/2008 | Hughes et al. |
| 7,619,743 B2 | 11/2009 | Digonnet |
| 2008/0079947 A1 | 4/2008 | Sanders et al. |
| 2012/0307251 A1* | 12/2012 | Sanders ............... G01C 19/727 356/460 |
| 2013/0070252 A1* | 3/2013 | Feth .................... G01C 19/727 356/461 |

FOREIGN PATENT DOCUMENTS

| CA | 2443127 | 10/2002 |
| EP | 2530504 A1 | 12/2012 |
| EP | 2573600 A1 | 3/2013 |

OTHER PUBLICATIONS

European Patent Office, "Extended European Search Report from EP Application No. 18178915.7 dated Nov. 26, 2018", "from Foreign Counterpart of U.S. Appl. No. 15/635,506", Nov. 26, 2018, p. 1-7, Published in: EP.

* cited by examiner

*Primary Examiner* — Hwa Andrew Lee
(74) *Attorney, Agent, or Firm* — Fogg & Powers LLC

(57) ABSTRACT

A resonant fiber optic gyroscope comprises: a ring resonator including a fiber coil fabricated from a first type of hollow core fiber; a light source to produce at least two light beams, wherein a first light beam is configured to travel in a clockwise direction in the ring resonator and a second light beam is configured to travel in a counterclockwise direction in the ring resonator; a filter resonator assembly coupled between the light source and the ring resonator including: at least two short pieces of optical fiber shorter in length than the fiber coil, the at least two short pieces of optical fiber fabricated from the first type of hollow core fiber; and wherein prior to the beams entering the ring resonator, a plurality of reflective devices are configured to condition the beams such that they excite the fundamental mode of the hollow core fiber within the ring resonator.

18 Claims, 4 Drawing Sheets

RESONANT FIBER OPTIC GYROSCOPE WITH HOLLOW CORE FIBER

BACKGROUND

Low cost, small sized navigation grade gyroscopes for commercial navigation applications are preferred. Among optical gyroscope technologies, resonator fiber optic gyro (RFOG) could potentially satisfy those needs by providing better signal to noise sensitivity to rotation rate measurement than the existing interferometric fiber optic gyroscopes (IFOG) and the ring laser gyroscopes (RLG).

In conventional RFOGs, a ring resonator is formed using a fiber optic coil and at least one coupler to couple light into and out of the resonator in clockwise and counterclockwise directions. At least two input light waves are frequency-tuned to the resonances of the resonator in the clockwise and counterclockwise directions respectively. After measuring the resonance frequencies in the two directions by tuning each input beam to them, the input beam frequencies are compared, and the difference is proportional to the rotation rate of the resonator coil.

Some conventional RFOGs use glass core fibers. To get a better signal to noise ratio, the power of the light signal received by the RFOG is increased. However, because of the refractive index of the glass, high power can cause lasing due to Brillouin scattering within the glass core fiber. Accordingly, some RFOGs use hollow core fibers that do not have glass in the core.

However, one of the major issues in conventional RFOGs is bias instability; that is, an indicated output when the gyroscope is not rotating. One of the major causes of this bias instability in RFOGs is that light that is intended to be introduced into the resonator is not matched properly into it. When using practical Hollow Core Fiber (HCF) for the resonator, this improperly matched light excites higher order modes in the HCF resonator, causing bias errors.

For the reasons stated above and for other reasons stated below, it will become apparent to those skilled in the art upon reading and understanding the specification, there is a need in the art for methods and systems that reduce errors in the RFOGs using hollow core fiber.

SUMMARY

A resonant fiber optic gyroscope (RFOG) is provided. The RFOG comprises a ring resonator including a fiber coil fabricated from a first type of hollow core fiber. The RFOG further comprises at least one light source to produce at least two light beams, wherein a first light beam of the at least two light beams is configured to travel in a clockwise direction in the ring resonator and a second light beam of the at least two light beams is configured to travel in a counterclockwise direction in the ring resonator. The RFOG also comprises a filter resonator assembly coupled between the at least one light source and the ring resonator. The filter resonator assembly includes at least two short pieces of optical fiber, wherein the at least two short pieces of optical fiber are shorter in length than the fiber coil, and wherein the at least two short pieces of optical fiber are fabricated from the first type of hollow core fiber. The filter resonator assembly further includes a plurality of reflective devices, wherein prior to the first light beam and the second light beam entering the ring resonator, the plurality of reflective devices are configured to condition the first light beam and the second light beam such that they excite the fundamental mode of the hollow core fiber within the ring resonator.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
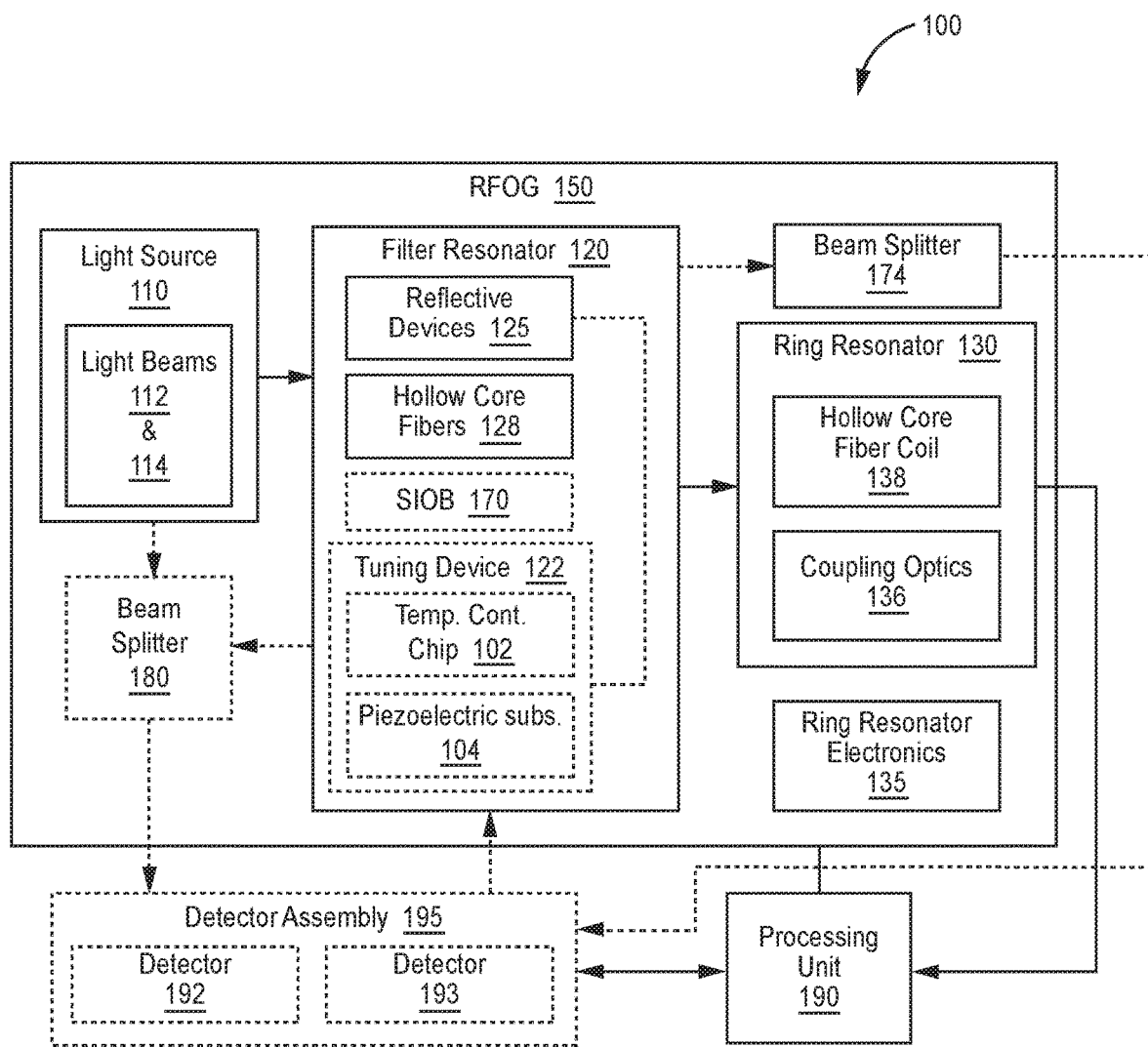
FIG. 1 is a block diagram of one embodiment of a resonant fiber optic gyroscope (RFOG) system in accordance with the embodiments described herein.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Light generated by conventional lasers and beam forming optical systems typically are coupled into standard glass-core fibers and are engineered to have Gaussian shapes to couple efficiently into them, and the light is Gaussian shaped after passing through a single mode standard fiber. That is, if the standard glass-core fiber is sliced perpendicular to its axis, the cross section of the standard glass-core fiber reveals a light signal that has a central peak in the core of the fiber.

Unlike glass-core fiber, the fundamental mode shape of a hollow core fiber (HCF), used in an RFOG, is not Gaussian. Light propagating in the hollow core fiber coil of the resonator has a central peak that is approximately cylindrically symmetric with peak intensity in the center of the hollow core of the fiber like the light generated by conventional optical systems. However, the light also includes one or more side lobes on either side of the central peak. These side lobes often reside in the hollow part of the capillaries surrounding the core. In conventional RFOG designs using an HCF resonator coil, the light is delivered to the resonator via a standard fiber, which shapes the light mode field to be different from the fundamental mode field that propagates in HCF.

When the light signal is introduced from a standard glass-core fiber to the hollow core fiber coil of a resonator of the RFOG, a significant amount of light is not able to couple into the fundamental mode, and worse yet, couples into a higher order mode of the HCF if the HCF is not a perfectly single spatial-mode waveguide. A higher order mode may, for instance, have multiple lobes with high intensity towards the edge of the hollow core fiber rather than the center. In a higher order mode, light travels in the fiber with a different velocity than the fundamental, and causes gyroscope errors.

Embodiments described herein provide methods and systems to reduce errors caused in the RFOG due to mismatch between the fundamental mode of the light source generating the light (or the fiber or waveguide delivering light from the light source to the resonator), that is, "the input light" to the resonator, and fundamental mode of the hollow core fiber coil of the resonator of the RFOG. Specifically, embodiments of the present description provide a filter resonator assembly that filters the input light signal that would excite the higher order mode of the HCF fiber so that the light introduced to the input of the hollow core fiber coil of the resonator resonates only at a certain frequency corresponding to light propagation in its fundamental mode only, and does not, to any substantial degree, excite a higher order mode of the HCF.

FIG. 1 is a block diagram of one embodiment of a system 100 utilizing RFOG 150. RFOG 150 measures rotation rate and outputs a signal indicative of the rotation rate to a processing unit 190. Processing unit 190 uses the signal indicative of rotation rate from the RFOG 150 to calculate parameters such as angular orientation and angular velocity.

The functions and processes performed by processing unit 190 can be implemented using software, firmware, hardware, or any appropriate combination thereof, as known to one of skill in the art. These may be supplemented by, or incorporated in, specially designed application-specific integrated circuits (ASICs) or field programmable gate arrays (FPGAs). The processing unit 190 can also include functions with software programs, firmware, or other computer readable instructions for carrying out various process tasks, calculations, and control functions used in the present embodiments.

As shown in FIG. 1, RFOG 150 includes a light source 110, a filter resonator assembly 120 and a ring resonator 130, consisting of a hollow core fiber optic coil 138 and input/output coupling optics 136 for coupling light into and out of the ring resonator. Light source 110 is configured to produce at least two light beams 112 and 114 for input into filter resonator assembly 120. In some embodiments, light source 110 generates one or more light beams 112 and 114 in a core fiber having a fundamental mode that is Gaussian shaped. First beam 112 is configured to travel in clockwise direction in ring resonator 130 and second beam 114 is configured to travel in a counterclockwise direction in ring resonator 130.

Ring resonator 130 includes a hollow core fiber coil 138. In exemplary embodiments, hollow core fiber coil 138 is fabricated from a first type of hollow core fiber. In exemplary embodiments, hollow core fiber coil 138 is at least 20 meters long. The output of ring resonator 130 is further coupled to ring resonator electronics 135 included in RFOG 150. The ring resonator electronics 135 generate a signal indicative of a rotation rate of ring resonator 130. Ring resonator electronics may include photodetectors that sense the output light from the resonator, and may include a photodetector for sensing input light wave frequency difference between clockwise and counterclockwise traveling light in the fiber coil. In exemplary embodiments, signal generated by ring resonator electronics 135 is configured to be received by processor 190 for parameter calculations. In one embodiment, the ring resonator electronics are in communication with the light 110 to modulate and drive light beams 112 and 114 to resonance within the optical portion of the ring resonator.

As mentioned, RFOG 150 includes a filter resonator assembly 120. Filter resonator assembly 120 attenuates light beams from propagating in one or more higher order modes. The light beam has to propagate within a hollow core fiber for a long time and over a long distance to reach a point where the light is substantially only in the fundamental mode and attenuate excitation in the higher order mode. However, using a long piece of hollow core fiber to facilitate propagation of the light beam can be costly.

Accordingly, filter resonator assembly 120 includes two short pieces of filter hollow core fibers 128 and a plurality of reflective devices 125. In exemplary embodiments, filter resonator assembly 120 includes at least four reflective devices 125. One reflective device is placed at either end of each short piece of filter hollow core fiber 128. Each of the filter hollow core fibers 128 is shorter in length than hollow core fiber coil 138. In exemplary embodiments, each short piece of filter hollow core fiber 128 has a length of less than one meter. The at least two light beams 112 and 114 generated by light source 110 are received by filter resonator assembly 120 and coupled into the filter hollow core fiber pieces 128.

Figure 2:
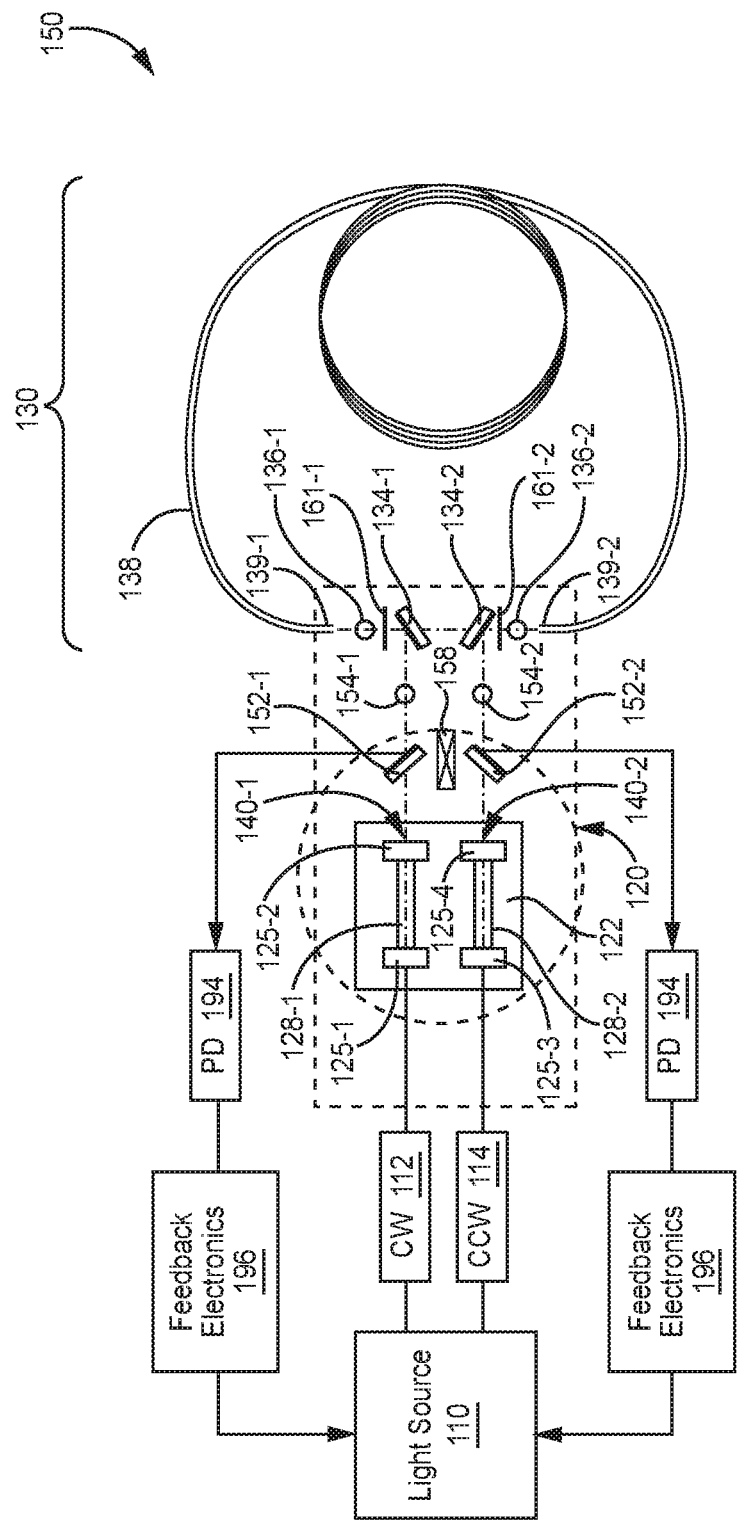
FIG. 2 is a block diagram of one embodiment of an RFOG used in an example system of FIG. 1 in accordance with the embodiments described herein.

FIG. 2 shows one embodiment of an RFOG 150 that can be included in a system 100. As shown in FIG. 2, filter resonator assembly 120 includes at least four reflective devices 125-1, 125-2, 125-3 and 125-4, and at least two short pieces of filter hollow core fiber 128-1 and 128-2. Reflective devices 125-1 is placed at a first end of a first short piece of filter hollow core fiber 128-1 and reflective device 125-2 is placed at a second end of the first short piece of filter hollow core fiber 128-1. Similarly, reflective device 125-3 is placed at a first end of second short piece of filter hollow core fiber 128-2 and reflective device 125-4 is placed at a second end of the second short piece of filter hollow core fiber 128-2.

In exemplary embodiments, reflective devices 125-1, 125-2, 125-3 and 125-4 are mirrors. In further exemplary embodiments, reflective devices 125-1, 125-2, 125-3 and 125-4 are partially reflective mirrors. In exemplary embodiments, reflective devices 125-1, 125-2, 125-3 and 125-4 are 1 mm or smaller in length.

First light beam 112 is coupled into the first short piece of filter hollow core fiber 128-1. The light beam 112 propagates back and forth in the short piece of filter hollow core fiber 128-1 reflecting from reflective devices 125-1 and 125-2. Reflective devices 125-1 and 125-2 enable propagation of the light beam within the filter hollow core fiber 128-1 until light beam 112 is resonated in the fundamental mode. Similarly, light beam 114 is coupled into the second short piece of filter hollow core fiber 128-2. Light beam 114 propagates back and forth in the short piece of filter hollow core fiber 128-2 reflecting from reflective devices 125-3 and 125-4. Reflective devices 125-3 and 125-4 enable propagation of the light beam within the filter hollow core fiber 128-2 until light beam 114 is resonated in the fundamental mode. Light beams 112 and 114 are then introduced into ring resonator 130 at the center frequency for the fundamental spatial mode. Accordingly, the plurality of reflective devices 125 are configured to condition the first light beam 112 and the second light beam 114 such that they will excite the fundamental mode of the hollow core fiber 138 in the ring resonator 130. In such an example, when the first light beam 112 and the second light beam 114 propagate within the hollow core fiber 138 of ring resonator 130, each propagates at its resonance frequency.

As shown in FIG. 2, the ring resonator 130 receives light beams 112 and 114 at partially reflective devices 134-1 and 134-2, respectively, after they are resonated in the fundamental mode in the filter resonator assembly 120. Light beam 112 reflects off partially reflective device 134-1 and propagates through ring resonator 130 in a clockwise direction. Light beam 114 reflects off partially reflective device 134-2 and propagates through ring resonator 130 in a counterclockwise direction. In exemplary embodiments, partially reflective devices 134-1 and 134-2 can be mirrors that are reflective within a range of 1-10% (thus, transmissive of approximately 90-99% of the light). When input beams 112 and 114 are tuned to the resonance frequencies of clockwise and counter clockwise resonances of the ring resonator 130, the partially reflective mirrors 134-1 and 134-2 introduce at least a majority of input light into the ring resonator 130.

In some example embodiments, after reflecting off partially reflective devices 134-1 and 134-2, beams 112 and 114 are directed to ball lenses 136-1 and 136-2 respectively, and are further focused into hollow core fiber coil 138 at clockwise input end 139-1 and counterclockwise input end 139-2. In some example embodiments, after reflecting off partially reflective devices 134-1 and 134-2, beams 112 and 114 propagate through polarizer 161-1 and 161-2 respectively prior to being received by the ring resonator at clockwise input end 139-1 and counterclockwise input end 139-2. A polarizer, such as polarizers 161-1 and 161-2 remove unwanted polarization of light from beams 112 and 114.

The fundamental mode in which the light beams 112 and 114 are resonated in the filter assembly matches with the fundamental spatial mode of the hollow core fiber coil 138 included in the ring resonator 130. Further, the frequencies of light beams 112 and 114 are tuned to clockwise and counter clockwise resonance frequencies of ring resonator 130.

In exemplary embodiments, RFOG 150 further includes partially reflective devices 152-1 and 152-2. In some example embodiments, light beams 112 and 114 propagate through partially reflective devices 152-1 and 152-2 respectively prior to being received by the ring resonator 130. In some example embodiments, RFOG 150 includes ball lenses 154-1 and 154-2 to focus light beams 112 and 114 from partially reflective mirrors 152-1 and 152-2 to partially reflective mirrors 134-1 and 134-2 respectively. In some example embodiments, RFOG 150 includes a beam blocker 158 between partially reflective mirrors 152-1 and 152-2 so that beam 112 is not reflected from partially reflective mirror 154-1 to partially reflective mirror 152-2 and vice versa.

After entering ring resonator 130, beams 112 and 114 are configured to propagate around ring resonator 130 for a pre-determined number of passes. For example, light entering ring resonator enters at partially reflective mirror 134-1, then propagates toward resonator coil input end 139-1, and then enters resonator coil input end 139-1. Beam 112 completes one pass around ring resonator 130 when it is received again by ring resonator coil 138 at input end 139-1, after it has propagated through hollow core fiber coil 138 in the clockwise direction, and propagated through partially reflective devices 134-2 and 134-1. Similarly, beam 114 is introduced at partially reflective mirror 134-2, propagates toward resonator coil end 139-2, and enters the resonator coil 138 at input end 139-2. Beam 114 then completes one pass around ring resonator 130 after it propagates through hollow core fiber coil 138 in the counterclockwise direction, and further propagates through partially reflective devices 134-1 and 134-2. After, light beams 112 and 114 have completed a pre-determined number of passes, the light beam is sent to an output detector.

For example, in some exemplary embodiments, the pre-determined number of passes may be two. In such an example, after light beam 112, which travels in the clockwise direction has passed through the ring resonator 130 two times, a portion of the light is reflected from the partially reflective device 134-2. The portion of light reflected is based on the reflectiveness of the partially reflective device 134-2. The reflected portion of the light travels to partially reflective mirror 152-2, and reflects off partially reflective mirror 152-2 to be fed into a photodetector 194. Photodetector 194 detects the amount of light transmitted from the ring resonator 130 and sends the signal to feedback electronics 196. When feedback electronics 196 determines that the resonance is at maximum intensity or resonance center, feedback electronics 196 stops tuning the frequency of the laser transmitted from laser source 110. In exemplary embodiments, detector assembly 195 includes photodetectors 194.

Similarly, after light beam 114 has passed through ring resonator 130 for a pre-determined number of times, a portion of the light from light beam 114 is reflected from partially reflective device 134-1. This portion of light reflected is based on the reflectiveness of partially reflective device 134-1. The reflected portion of the light travels to partially reflective mirror 152-1, and reflects off partially reflective mirror 152-1 to be fed into a photodetector 194. Photodetector 194 detects the amount of light transmitted from the ring resonator 130 and sends the signal to feedback electronics 196. When feedback electronics 196 determines that the resonance is at maximum intensity or at resonance center, feedback electronics 196 stops tuning the frequency of the laser transmitted from laser source 110. In exemplary embodiments, feedback electronics 196 include ring resonator electronics 135.

In some exemplary embodiments, the filter resonator assembly 120 is tunable based on the input frequency required for resonance in ring resonator 130 so that the light beam exiting the filter resonator assembly 120 matches the spatial mode of the light beam directed into ring resonator 130. If the frequency range of the filter resonator assembly 120 is too narrow, the filter resonator assembly will cut the beam off when it moves over a certain frequency to match the resonance frequency of the ring resonator 130. Accordingly, in some embodiments, the frequency of the filter resonator assembly 120 can be adjusted based on input frequency of the ring resonator 130.

Referring briefly back to FIG. 1, in exemplary embodiments, reflective devices 125 are mounted on a tuning device 122. As shown in FIG. 1, in some embodiments, tuning device 122 is a temperature controlled chip. That is, the frequency of the light beams 112 and 114 in filter resonator assembly 120 can be adjusted using a temperature controlled chip. In such an example, the filter resonator assembly 120 is mounted in a temperature controlled chip and the frequency of the light beams 112 and 114 in filter resonator assembly 120 can be tuned by adjusting the temperature of the chip to bring reflective devices 125 in each pair (For example, 125-1 and 125-2, 125-3 and 125-4 as shown in FIG. 2) closer together or further apart.

As shown in FIG. 1, in some embodiments, tuning device 122 is a piezoelectric substrate on a silicon chip. In one such embodiment, the reflective devices 125 are mounted on a piezoelectric substrate on a silicon chip. To tune the light beams 112 and 114 to a desired frequency, the piezoelectric substrate can be adjusted by adjusting the voltage. As piezoelectric substrate expands or contracts, reflective devices 125 in each pair (For example, 125-1 and 125-2, 125-3 and 125-4 as shown in FIG. 2) are brought closer together or further apart from each other. The change in distance shifts the center wavelength of the filter resonance and tunes the filters so that the light beams 112 and 114 always pass through.

As further shown in FIG. 1, in exemplary embodiments, system 100 includes detector assembly 195 that detects the intensity of the light in light beams 112 and 114 reflected by, or transmitted by, at least one of the filters in the filter resonator assembly 120 to adjust the resonance frequency of the filter resonator assembly 120. In exemplary embodiments, detector assembly 195 includes a first detector 195-1 to detect intensity of the light in light beam 112 and a second detector 195-2 to detect intensity of the light in light beam 114. RFOG 150 further includes at least one beam splitter 180 that is coupled to filter resonator assembly 120. Beam splitter 180 taps a portion of light beams 112 and/or 114 and sends it to a detector assembly 195 that determines the intensity component of light in light beams 112 and/or 114 passing through the filter assembly 120. In FIG. 1, this component of light intensity in light beams 112 and/or 114 that passes through the filter assembly 120 is sensed indirectly by sensing the light reflection from the filter input. That is, detector assembly 195 determines the intensity of the light sensed in the reflection from the filter input, and based on the intensity of the light sensed in the reflection (i.e, light that does not pass through the filter assembly 120), the intensity of the light that passes through the filter assembly 120 can be inferred. In example embodiments, fifty percent or less of the maximum light in each light beam 112 and 114 is sensed.

Figure 3:
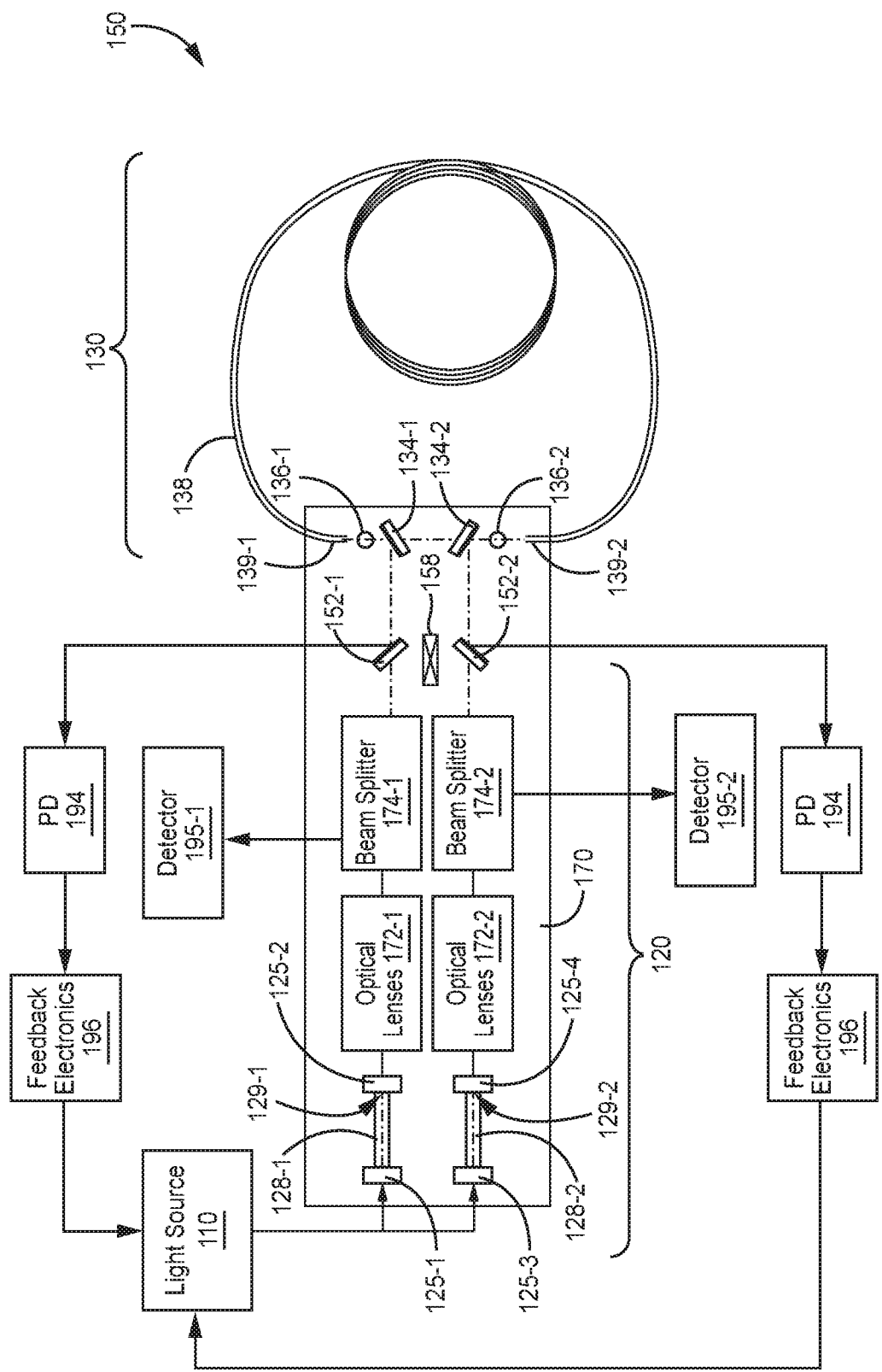
FIG. 3 is a block diagram of another embodiment of an RFOG used in an example system of FIG. 1 in accordance with the embodiments described herein.

In exemplary embodiments, the intensity of the light that passes through the filter assembly 120 is sensed directly via beam splitter(s) 174 (also, see FIG. 3). In exemplary embodiments, beam splitter 174 includes beam splitters 174-1 and 174-2. As shown in FIG. 3, a fraction of the component of light transmitted through the filter assembly 120 is tapped out by beam splitters 174-1 and 174-2 and sensed at detectors 195-1 and 195-2, i.e. sensed more directly in transmission. In exemplary embodiments, two percent or less of the maximum light in each light beam 112 and 114 is tapped off by beam splitters 174-1 and 174-2, respectively. Accordingly, in example embodiments, the output of filter assembly 120 can be sensed through either or both transmission and reflection.

In one example embodiment, beam splitter 180 is coupled to filter resonator assembly 120. Beam splitter 180 taps a portion of light beams 112 and/or 114 after they have propagated through the filter resonator assembly 120 but prior to being introduced into hollow core fiber coil 138 and sends it to detector assembly 195. The remaining portion of light beams 112 and/or 114 passes through. Detector assembly 195 monitors the light being input into ring resonator 130. Detector assembly 195 is further coupled with filter resonator assembly 120. Accordingly, when detector assembly 195 detects a significant change in the light being input into ring resonator 130, it determines a discrepancy in the center frequency between the filter resonator assembly 120 and ring resonator 130. Filter resonator assembly then adjusts itself to align its center frequency with the center frequency of the hollow core fiber coil 138 so that maximum light is introduced from filter resonator assembly 120 to ring resonator 130.

In one example embodiment, beam splitter 180 is coupled to light source 110. Beam splitter 180 taps a portion of light beams 112 and/or 114 from light source 110 prior to being introduced into filter resonator assembly 120 and sends it to detector assembly 195, which include detectors 195-1 and 195-2. The remaining portion of light beams 112 and/or 114 is received by filter resonator assembly 120. Detector assembly 195 monitors the intensity of the light being input into filter resonator assembly 120. Detector assembly 195 is further coupled with filter resonator assembly 120. Accordingly, when detector assembly 195 detects a change in the intensity of the laser light, but not a filter resonance frequency change, the filter resonator assembly 120 does not adjust itself for frequency discrepancy.

In some example embodiments, detector assembly 195 of system 100 includes at least two detectors 192 and 193. In such an example, one or more detector(s) 192 monitor the intensity of the light being input into filter resonator assembly 120 and one or more detector(s) 193 detect a discrepancy in the center frequency between the filter resonator assembly 120 and ring resonator 130. The output from the detectors 192 and 193 are compared in a processing unit, such as processing unit 190. When there is no difference in the two outputs, it can be determined that the change in the amount of light output from filter resonator assembly 120 is due to change in the intensity of light received from light source 110 itself and no adjustments in the filter resonator assembly 120 are needed for frequency discrepancy. When there is a change in the difference of the two outputs, the filter resonator assembly 120 is adjusted to align its center frequency with the center frequency of the ring resonator 130 consisting of the hollow core fiber coil 138 so that maximum light is introduced from filter resonator assembly 120 to ring resonator 130.

Accordingly, the center frequency of the fundamental mode in the filters (such as hollow core fibers 128-1 and 128-2) in filter assembly 120, in which the light beams 112 and 114 are first resonated, substantially matches with center frequency of the fundamental spatial mode of the hollow core fiber coil 138 included in the ring resonator 130. Further, the filter resonator assembly 120 is configured to maximize the light passing through the filter resonator assembly that are frequency-tuned to the clockwise and counterclockwise resonance frequencies of the fundamental spatial mode that is resonating within the hollow core fiber coil of the ring resonator. However, splicing with hollow core fiber can be lossy, and directional couplers in hollow core fiber to replace the partially reflective mirrors are very challenging to make. Further, standard splicing techniques may result in collapse of the hollow core fiber. FIG. 3 is a block diagram of one embodiment of an RFOG 150 as described herein to ease the coupling of light beams, such as light beams 112 and 114, from filter resonator assembly 120 to ring resonator 130.

As shown in FIG. 3, in exemplary embodiments, the filter resonator assembly 120 further includes a silicon optical bench (SIOB) 170. SIOB 170 enables closing the resonator loop via free-space optics. In such an embodiment, the two filter hollow core fibers 128-1 and 128-2 are attached to the SIOB 170. In further exemplary embodiments, reflective devices 125-1, 125-2, 125-3 and 125-4 are partially reflective mirrors, and are mounted on the SIOB 170. Laser beams 112 and 114 are introduced into filter hollow core fiber pieces 128-1 and 128-2 by first passing through partially reflective mirrors 125-1 and 125-3 respectively.

The partially reflective mirror pair 125-1 and 125-2 with the filter hollow core fiber piece 128-1, and the partially reflective mirror pair 125-3 and 125-4 with the filter hollow core fiber piece 128-2 form a filter resonator assembly that resonates on the fundamental spatial mode of the hollow core fiber. Accordingly, light exiting the hollow core fiber piece 128-1 passes through the second partially reflective mirror 125-2, and light exiting the hollow core fiber piece 128-2 passes through the second partially reflective mirror 125-4 prior to being coupled into resonator 130.

As shown in FIG. 3, in exemplary embodiments, exiting end 129-1 of filter hollow core fiber 128-1 is attached to the SIOB 170. The clockwise input end 139-1 of hollow core fiber coil 138 is also attached to the SIOB 170. In one such embodiment, exiting end 129-1 and clockwise input end 139-1 are focused into each other via a set of optical lenses 172-1 and 136-1 on the SIOB 170. In a further implementation of this embodiment, beam splitter 174-1 is included on the SIOB 170 between the set of optical lenses 172-1 for coupling clockwise light beam 112 from filter resonator assembly 120 to ring resonator 130.

Similarly, as shown in FIG. 3, exiting end 129-2 of filter hollow core fiber 128-2 is attached to the SIOB 170. The counterclockwise input end 139-2 of hollow core fiber coil 138 is also attached to the SIOB 170. In one such embodiment, exiting end 129-2 and counterclockwise input end 139-2 are focused into each other via a set of optical lenses 172-2, and 136-2 on the SIOB 170. In a further implementation of this embodiment, beam splitter 174-2 is included on the SIOB 170 between the set of optical lenses 172-2 for coupling counterclockwise light beam 114 from filter resonator assembly 120 to ring resonator 130. A portion of the light of beam 112 is split via beam splitter 174-1 and fed into detector 195-1, which detects the intensity of the light in beam 112 input into ring resonator 130. A portion of the light of beam 114 is split via beam splitter 174-2 and fed into detector 195-2, which detects the intensity of the light in beam 114 input into ring resonator 130.

Figure 4:
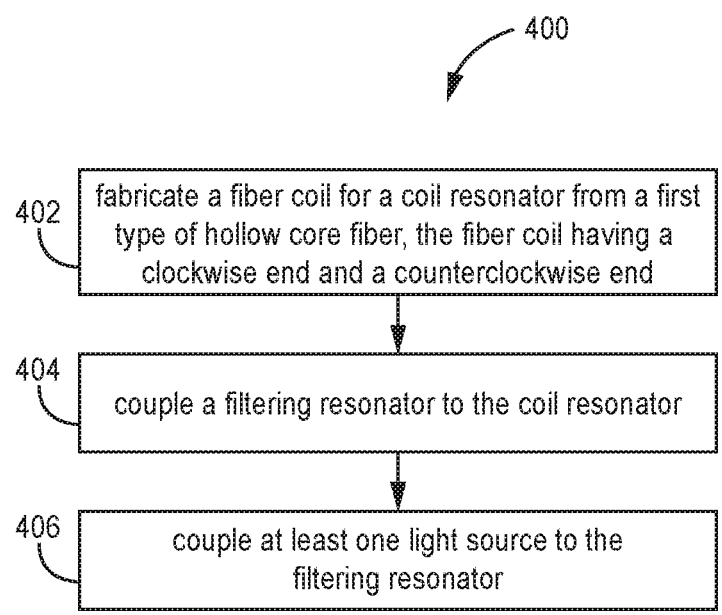
FIG. 4 is a flow diagram of one embodiment of a method to manufacture an RFOG in accordance with the embodiments described herein.

FIG. 4 is a flow diagram of an example method 400 of manufacturing a resonator fiber optic gyroscope (RFOG), such as an RFOG 150. It should be understood that method 400 may be implemented in conjunction with any of the various embodiments and implementations described in this disclosure with respect to FIGS. 1-3. As such, elements of method 400 may be used in conjunction with, in combination with, or substituted for elements of those embodiments.

Method 400 begins at block 402 with fabricating a fiber coil, such as fiber coil 138 for a ring resonator, such as ring resonator 130 from a first type of hollow core fiber. The fiber coil has a clockwise end, such as 139-1, and a counterclockwise end, such as 139-2.

Method 400 then proceeds to block 404 with coupling a filter resonator assembly, such as filter resonator assembly 120, to the ring resonator. Coupling a filter resonator assembly with the ring resonator further includes fabricating a first short piece of optical fiber, such as short piece of optical fiber 128-1 from the first type of hollow core fiber, wherein the first short piece of optical fiber is shorter than the fiber coil, and wherein the first short piece of optical fiber is coupled to the clockwise end of the fiber coil. Coupling a filter resonator assembly with the ring resonator further comprises fabricating a second short piece of optical fiber, such as short piece of optical fiber 128-2 from the first type of hollow core fiber, wherein the second short piece of optical fiber is shorter than the fiber coil, and wherein the second short piece of optical fiber is coupled to the counterclockwise end of the fiber coil. In example embodiments, optical fibers 128-1 and/or 128-2 can be hollow core fiber coils.

Coupling a filter resonator assembly with the ring resonator further comprises placing a first reflective device, such as a first reflective device 125-1 at a first end of the first short piece of optical fiber, placing a second reflective device, such as 125-2 at a second end of the first short piece of optical fiber, placing a third reflective device, such as 125-3 at a first end of the second short piece of optical fiber, placing a fourth reflective device, such as 125-4 at a second end of the second short piece of optical fiber. In exemplary embodiments of method 400, the first reflective device comprises is a first partially reflective mirror, the second reflective device is a second partially reflective mirror, the third reflective device is a third partially reflective mirror, and the fourth reflective device is a fourth partially reflective mirror.

In exemplary embodiments of method 400, coupling a filter resonator assembly to the ring resonator includes fabricating a silicon optical bench (SIOB), such as SIOB 170, and mounting the first reflective device, the second reflective device, the third reflective device and the fourth reflective device on the SIOB. In exemplary embodiments, a first set of optical lenses, such as optical lenses 172-1, and a first beam splitter, such as beam splitter 174-1, are provided on the SIOB between the second reflective surface and a clockwise-entrance end of the fiber coil. In exemplary embodiments, a second set of optical lenses, 174-2 and a second beam splitter 174-2 are provided on the SIOB between the fourth reflective surface and a counterclockwise-entrance end of the fiber coil.

In exemplary embodiments of method 400, coupling the filter resonator assembly to the ring resonator further comprises mounting the at least four reflective devices on a piezoelectric substrate in a silicon chip. In exemplary embodiments of method 400, coupling the filter resonator assembly to the ring resonator further comprises mounting the first reflective device, the second reflective device, the third reflective device and the fourth reflective device on a temperature controlled chip and adjusting the temperature of the temperature controlled chip.

In exemplary embodiments of method 400, coupling the filter resonator assembly to the ring resonator further comprises coupling a beam splitter, such as beam splitter 180, to the filter resonator assembly and coupling a detector, such as detector 193, to the beam splitter. The beam splitter receives a portion of the output from the filter resonator assembly after the first light beam has propagated through the second reflective device and the second light beam has propagated through the fourth reflective device. The beam splitter then sends the portion of the output from the filter resonator assembly to a detector. The detector monitors intensity of light in the first light beam and the second light beam propagating through the filter resonator assembly.

In exemplary embodiments of method 400, coupling the filter resonator assembly to the ring resonator further comprises coupling a beam splitter, such as beam splitter 180, to the filter resonator assembly, and coupling a detector, such as detector 192, to the beam splitter. The beam splitter receives a portion of the output from the at least one light source, and sends the portion of the output from the at least one light source to the detector, wherein the detector is configured to monitor intensity of light propagating through the filter resonator assembly to tune the filter resonator assembly.

Method 400 then proceeds to block 406 with coupling at least one light source, such as light source 110, to the filter resonator assembly. The light source generates a first light beam, such as light beam 112, that is coupled into the first reflective device, wherein the first light beam is configured to propagate through the first short piece of optical fiber. The light source further generates a second light beam, such as light beam 114 coupled to the third reflective device, wherein the second light beam is configured to propagate through the second short piece of optical fiber.

In some exemplary embodiments, method 400 further comprises coupling the ring resonator to a processor, wherein the processor is configured to process a signal indicative of a rotation rate of the ring resonator.

EXAMPLE EMBODIMENTS

Example 1 includes a resonant fiber optic gyroscope (RFOG) comprising: a ring resonator including a fiber coil fabricated from a first type of hollow core fiber; at least one light source to produce at least two light beams, wherein a first light beam of the at least two light beams is configured to travel in a clockwise direction in the ring resonator and a second light beam of the at least two light beams is configured to travel in a counterclockwise direction in the ring resonator, a filter resonator assembly coupled between the at least one light source and the ring resonator, the filter resonator assembly including: at least two short pieces of optical fiber, wherein the at least two short pieces of optical fiber are shorter in length than the fiber coil, and wherein the at least two short pieces of optical fiber are fabricated from the first type of hollow core fiber; and a plurality of reflective devices, wherein prior to the first light beam and the second light beam entering the ring resonator, the plurality of reflective devices are configured to condition the first light beam and the second light beam such that they excite the fundamental mode of the hollow core fiber within the ring resonator.

Example 2 includes the RFOG of Example 1, wherein each piece of the at least two short pieces of optical fiber has a first end and a second end, and wherein the plurality of reflective devices further comprises: a first reflective device positioned at a first end of a first of the at least two short pieces of optical fiber; a second of the at least four reflective devices positioned at a second end of the first of the at least two short pieces of optical fiber; a third of the at least four reflective devices positioned at a first end of a second of the at least two short pieces of optical fiber; and a fourth of the at least four reflective devices positioned at a second end of the second of the at least two short pieces of optical fiber.

Example 3 includes the RFOG of any of Examples 1-2, wherein the filter resonator assembly further comprises a silicon optical bench (SIOB), and wherein the at least four reflective devices are mounted on the SIOB.

Example 4 includes the RFOG of Example 3, wherein the filter resonator assembly further comprises at least one set of optical lenses and at least one beam splitter attached to the SIOB to couple the first light beam and the second light beam from the filter resonator assembly to the ring resonator.

Example 5 includes the RFOG of any of Examples 1-4, further comprising: a beam splitter coupled to the filter resonator assembly; and a detector assembly coupled to the beam splitter, wherein the detector assembly includes at least two detectors; wherein the beam splitter is configured to: receive a portion of the output from the filter resonator assembly after the first of the at least two light beams has propagated through the second reflective device and the second of the at least two light beams has propagated through the fourth reflective device, and send the portion of the output from the filter resonator assembly to the detector assembly including, wherein the detector assembly is configured to monitor intensity of light in the first light beam and the second light beam propagating through the filter resonator assembly to tune the filter resonator assembly.

Example 6 includes the RFOG of any of Examples 1-5, further comprising: a detector assembly coupled to an input of the filter resonator assembly, wherein the detector assembly includes at least two detectors; wherein the detector assembly is configured to: receive at least a portion of the light that is reflected from the filter assembly; and monitor the intensity of light propagating through the filter resonator assembly to tune the filter resonator assembly.

Example 7 includes the RFOG of any of Examples 1-6, wherein the at least four reflective devices are mounted on a piezoelectric substrate in a silicon chip.

Example 8 includes the RFOG of any of Examples 1-7, wherein the at least four reflective devices are mounted on a temperature controlled chip, and wherein the filter resonator assembly is tunable by adjusting the temperature of the temperature controlled chip.

Example 9 includes the RFOG of any of Examples 1-8, wherein the at least four reflective devices are partially reflective mirrors.

Example 10 includes the RFOG of any of Examples 1-9, wherein the fiber coil is at least 20 meters long, and wherein the at least two short pieces of optical fiber are equal to or less than 1 meter long.

Example 11 includes a method of manufacturing a resonator fiber optic gyroscope (RFOG), the method comprising: fabricating a fiber coil for a ring resonator from a first type of hollow core fiber, the fiber coil having a clockwise end and a counterclockwise end; coupling a filter resonator assembly to the ring resonator by: fabricating a first short piece of optical fiber from the first type of hollow core fiber, wherein the first short piece of optical fiber is shorter than the fiber coil, and wherein the first short piece of optical fiber is coupled to the clockwise end of the fiber coil; fabricating a second short piece of optical fiber from the first type of hollow core fiber, wherein the second short piece of optical fiber is shorter than the fiber coil, and wherein the second short piece of optical fiber is coupled to the counterclockwise end of the fiber coil; placing a first reflective device at a first end of the first short piece of optical fiber; placing a second reflective device at a second end of the first short piece of optical fiber; placing a third reflective device at a first end of the second short piece of optical fiber; placing a fourth reflective device at a second end of the second short piece of optical fiber; and coupling at least one light source to the filter resonator assembly, wherein the light source is configured to generate at least two light beams, a first of the two light beams configured to propagate in a clockwise direction in the ring resonator, and a second of the two light beams configured to propagate in a counterclockwise direction in the ring resonator.

Example 12 includes the method of Example 11, wherein coupling a filter resonator assembly to the ring resonator further comprises: fabricating a silicon optical bench (SIOB); and mounting the first reflective device, the second reflective device, the third reflective device and the fourth reflective device on the SIOB.

Example 13 includes the method of Example 12, wherein coupling the filter resonator assembly to the ring resonator further comprises: placing a first set of optical lenses and a first beam splitter on the SIOB between the second reflective surface and a clockwise end of the fiber coil; and placing a second set of optical lenses and a second beam splitter on the SIOB between the fourth reflective surface and a counterclockwise end of the fiber coil.

Example 14 includes the method of any of Examples 10-13, wherein coupling the filter resonator assembly to the ring resonator further comprises: mounting the first reflective device, the second reflective device, the third reflective device and the fourth reflective device on a temperature controlled chip, and adjusting the temperature of the temperature controlled chip.

Example 15 includes the method of any of Examples 10-14, wherein coupling the filter resonator assembly to the ring resonator further comprises: coupling a beam splitter to the filter resonator assembly; coupling a detector assembly to the beam splitter, wherein the detector assembly includes at least two detectors; wherein the beam splitter is configured to: receive a portion of the output from the filter resonator assembly after the first light beam has propagated through the second reflective device and the second light beam has propagated through the fourth reflective device; and send the portion of the output from the filter resonator assembly to a detector assembly, wherein the detector assembly is configured to monitor intensity of light in the first light beam and the second light beam propagating through the filter resonator assembly.

Example 16 includes the method of any of Examples 10-15, wherein coupling the filter resonator assembly to the ring resonator further comprises: coupling a detector assembly to the input of the filter resonator assembly, wherein the detector assembly includes at least two detectors; wherein the detector assembly is configured to: receive a portion of the light reflected from the filter assembly; and monitor intensity of light propagating through the filter resonator assembly to tune the filter resonator assembly.

Example 17 includes the method of any of Examples 10-16, wherein coupling the filter resonator assembly to the ring resonator further comprises mounting the at least four reflective devices on a piezoelectric substrate in a silicon chip.

Example 18 includes the method of any of Examples 10-17, wherein positioning the first reflective device comprises positioning a first partially reflective mirror; positioning the second reflective device comprises positioning a second partially reflective mirror; positioning the third reflective device comprises positioning a third partially reflective mirror; positioning the fourth reflective device comprises positioning a fourth partially reflective mirror.

Example 19 includes a hollow core optical fiber filter, the filter comprising: a hollow core optical fiber having a first end and a second end; at least two reflective device, wherein the first reflective device is positioned at the first end and the second reflective device is positioned at the second end; wherein a light beam received by the hollow core optical fiber filter propagates in the hollow core optical fiber until the light beam is resonated in a fundamental mode of the hollow core optical fiber at a selected frequency.

Example 20 includes the filter of Example 19, wherein the filter has an output that is configured to be coupled to an input of a resonant fiber optic gyroscope (RFOG).

What is claimed is:

1. A resonant fiber optic gyroscope (RFOG) comprising:
a ring resonator including a fiber coil fabricated from a first type of hollow core fiber;
at least one light source to produce at least two light beams, wherein a first light beam of the at least two light beams travels in a clockwise direction in the ring resonator and a second light beam of the at least two light beams travels in a counterclockwise direction in the ring resonator;
a filter resonator assembly coupled between the at least one light source and the ring resonator, the filter resonator assembly including:
at least two short pieces of optical fiber, wherein the at least two short pieces of optical fiber are shorter in length than the fiber coil, and wherein the at least two short pieces of optical fiber are fabricated from the first type of hollow core fiber; and
a plurality of reflective devices, wherein prior to the first light beam and the second light beam entering the ring resonator, the first light beam and the second light beam propagate between the plurality of reflective devices until they excite a fundamental mode of the hollow core fiber within the ring resonator,
a tuning device having at least one pair of reflective devices in the plurality of reflective devices mounted on a surface of the tuning device, wherein the tuning device is configured to change a distance between the at least one pair of reflective devices to tune the filter resonator assembly to the fundamental mode, a pair of reflective devices in the at least one pair being associated with one of the at least two short pieces of optical fiber.

2. The RFOG of claim 1, wherein each piece of the at least two short pieces of optical fiber has a first end and a second end, and wherein the plurality of reflective devices further comprises:
a first reflective device positioned at a first end of a first of the at least two short pieces of optical fiber;
a second of the at least four reflective devices positioned at a second end of the first of the at least two short pieces of optical fiber;
a third of the at least four reflective devices positioned at a first end of a second of the at least two short pieces of optical fiber; and
a fourth of the at least four reflective devices positioned at a second end of the second of the at least two short pieces of optical fiber.

3. The RFOG of claim 1, wherein the filter resonator assembly further comprises a silicon optical bench (SIOB), and wherein the plurality of reflective devices are mounted on the SIOB.

4. The RFOG of claim 3, wherein the filter resonator assembly further comprises at least one set of optical lenses and at least one beam splitter attached to the SIOB to couple the first light beam and the second light beam from the filter resonator assembly to the ring resonator.

5. The RFOG of claim 1, further comprising:
a beam splitter coupled to the filter resonator assembly; and
a detector assembly coupled to the beam splitter, wherein the detector assembly includes at least two detectors;
wherein the beam splitter is configured to:
receive a portion of the output from the filter resonator assembly after the first of the at least two light beams has propagated through the second reflective device and the second of the at least two light beams has propagated through the fourth reflective device, and
send the portion of the output from the filter resonator assembly to the detector assembly including, wherein the detector assembly is configured to monitor intensity of light in the first light beam and the second light beam propagating through the filter resonator assembly to tune the filter resonator assembly.

6. The RFOG of claim 1, further comprising:
a detector assembly coupled to an input of the filter resonator assembly, wherein the detector assembly includes at least two detectors;
wherein the detector assembly is configured to:
receive at least a portion of the light that is reflected from the filter assembly; and
monitor the intensity of light propagating through the filter resonator assembly to tune the filter resonator assembly.

7. The RFOG of claim 1, wherein the tuning device is a piezoelectric substrate in a silicon chip.

8. The RFOG of claim 1, wherein the tuning device is a temperature controlled chip, and wherein the filter resonator assembly is tunable by adjusting the temperature of the temperature controlled chip.

9. The RFOG of claim 1, wherein the at least four reflective devices are partially reflective mirrors.

10. The RFOG of claim 1, wherein the fiber coil is at least 20 meters long, and wherein the at least two short pieces of optical fiber are equal to or less than 1 meter long.

11. A method of manufacturing a resonator fiber optic gyroscope (RFOG), the method comprising:
fabricating a fiber coil for a ring resonator from a first type of hollow core fiber, the fiber coil having a clockwise end and a counterclockwise end;
coupling a filter resonator assembly to the ring resonator by:
fabricating a first short piece of optical fiber from the first type of hollow core fiber, wherein the first short piece of optical fiber is shorter than the fiber coil, and wherein the first short piece of optical fiber is coupled to the clockwise end of the fiber coil;
fabricating a second short piece of optical fiber from the first type of hollow core fiber, wherein the second short piece of optical fiber is shorter than the fiber coil, and wherein the second short piece of optical fiber is coupled to the counterclockwise end of the fiber coil;
placing a first reflective device at a first end of the first short piece of optical fiber;
placing a second reflective device at a second end of the first short piece of optical fiber;
placing a third reflective device at a first end of the second short piece of optical fiber;
placing a fourth reflective device at a second end of the second short piece of optical fiber; and
coupling at least one light source to the filter resonator assembly, wherein the light source is configured to generate at least two light beams, a first of the two light beams propagates in a clockwise direction in the ring resonator, and a second of the two light beams propagates in a counterclockwise direction in the ring resonator; and
tuning the filter resonator assembly to a fundamental mode for the ring resonator by changing the distance between the first reflective device and the second reflective device and changing the distance between the third reflective device and the fourth reflective device, wherein the first reflective device, the second reflective device, the third reflective device, and the fourth reflective device are mounted on a surface of at least one tuning device.

12. The method of claim 11, wherein coupling a filter resonator assembly to the ring resonator further comprises:
fabricating a silicon optical bench (SIOB); and
mounting the first reflective device, the second reflective device, the third reflective device and the fourth reflective device on the SIOB.

13. The method of claim 12, wherein coupling the filter resonator assembly to the ring resonator further comprises:
placing a first set of optical lenses and a first beam splitter on the SIOB between the second reflective surface and a clockwise end of the fiber coil; and
placing a second set of optical lenses and a second beam splitter on the SIOB between the fourth reflective surface and a counterclockwise end of the fiber coil.

14. The method of claim 11, wherein the at least one tuning device is a temperature controlled chip, tuning the filter resonator assembly to the fundamental mode further comprises
adjusting the temperature of the temperature controlled chip.

15. The method of claim 11, wherein coupling the filter resonator assembly to the ring resonator further comprises:
coupling a beam splitter to the filter resonator assembly;
coupling a detector assembly to the beam splitter, wherein the detector assembly includes at least two detectors;
wherein the beam splitter is configured to:
receive a portion of the output from the filter resonator assembly after the first light beam has propagated through the second reflective device and the second light beam has propagated through the fourth reflective device; and
send the portion of the output from the filter resonator assembly to a detector assembly, wherein the detector assembly is configured to monitor intensity of light in the first light beam and the second light beam propagating through the filter resonator assembly.

16. The method of claim 11, wherein coupling the filter resonator assembly to the ring resonator further comprises:
coupling a detector assembly to the input of the filter resonator assembly, wherein the detector assembly includes at least two detectors;
wherein the detector assembly is configured to:
receive a portion of the light reflected from the filter assembly; and
monitor intensity of light propagating through the filter resonator assembly to tune the filter resonator assembly.

17. The method of claim 11, wherein the tuning device is a piezoelectric substrate in a silicon chip.

18. The method of claim 11, wherein
positioning the first reflective device comprises positioning a first partially reflective mirror;
positioning the second reflective device comprises positioning a second partially reflective mirror;
positioning the third reflective device comprises positioning a third partially reflective mirror;
positioning the fourth reflective device comprises positioning a fourth partially reflective mirror.

* * * * *